Figure 1:
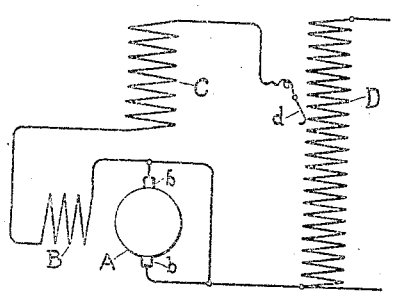

E. F. W. ALEXANDERSON.
ALTERNATING CURRENT MOTOR.
APPLICATION FILED JULY 15, 1907.

923,754.

Patented June 1, 1909.
3 SHEETS—SHEET 1.

Witnesses:

Inventor
Ernst F. W. Alexanderson,
by
Atty.

E. F. W. ALEXANDERSON.
ALTERNATING CURRENT MOTOR.
APPLICATION FILED JULY 15, 1907.
923,754.
Patented June 1, 1909.
3 SHEETS—SHEET 2.
Fig. 6.
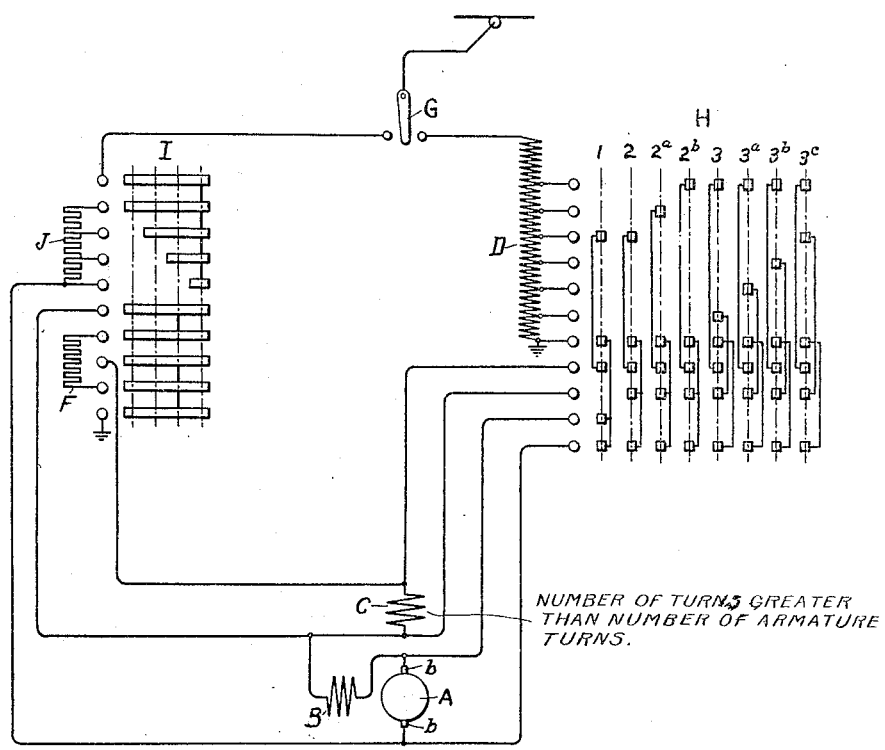
NUMBER OF TURNS GREATER THAN NUMBER OF ARMATURE TURNS.
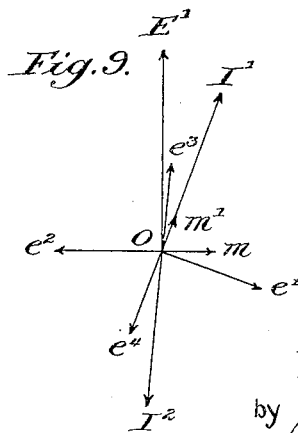
Fig. 9.
Witnesses
Irving E. Steers
J. Ellis Glen
Inventor
Ernst F. W. Alexanderson
by Albert G. Davis
Atty E. F. W. ALEXANDERSON.
ALTERNATING CURRENT MOTOR.
APPLICATION FILED JULY 15, 1907.

923,754.

Patented June 1, 1909.
3 SHEETS—SHEET 3.

Witnesses
Irving E. Steers.
J. Ellis Glen.

Inventor
Ernst F. W. Alexanderson
by Albert G. Davis
Atty.

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

ALTERNATING-CURRENT MOTOR.

No. 923,754.　　　　Specification of Letters Patent.　　　　Patented June 1, 1909.

Application filed July 15, 1907. Serial No. 323,307.

*To all whom it may concern:*

Be it known that I, ERNST F. W. ALEXANDERSON, a citizen of the United States, residing at Schenectady, county of Schenectady, State of New York, have invented certain new and useful Improvements in Alternating-Current Motors, of which the following is a specification.

My invention relates to alternating-current motors of the commutator type, and its object is to provide a novel method of operating such motors, whereby excellent commutation may be secured over a wide range of speed.

My invention further comprises certain arrangements of the motor itself, such that the full benefits of the method of operating it are obtained.

There are two well known forms of single-phase motor of the commutator type,—the compensated series motor and the repulsion motor. The compensated series motor is arranged with two separate windings on the stator, both connected in series with the armature. One stator winding, called the field or exciting winding, produces a magnetization at right angles electrically to the armature magnetization and thus produces in conjunction with the armature current the motor torque; the other, known as the compensating winding, produces a magnetization in line with the armature magnetization and serves to neutralize, or compensate for, the armature reaction and self-induction. The repulsion motor, in which the armature is in an independent circuit so that the armature current is produced by induction from the stator winding instead of being conducted thereto as in the series motor, may have its stator arranged with a single winding producing a magnetization at an angle to that of the armature, or may have on its stator two separate windings exactly like those of the compensated series motor. In the latter case the compensating winding of the series motor becomes the inducing winding which induces the current in the armature, the exciting winding producing the cross-field as in the series motor. In certain of its aspects my invention is limited to a motor having separate inducing and exciting windings on the stator, but in other aspects it relates broadly to any single-phase motor of the commutator type, which is capable of being started as a repulsion motor.

In the series motor, as soon as it has started, nearly all the voltage impressed on the motor is taken up at the armature terminals by the counter-electromotive force produced by the rotation, or in other words nearly all the power is in the armature. In the repulsion motor, since the armature is short-circuited, the voltage at the armature terminals is zero, so that all the impressed voltage is taken up by the stator windings and nearly all the power is in the stator, the counter-electromotive force being induced in the stator winding by the field which induces the currents in the short-circuited armature. Since this field must not only induce in the armature the low voltage required at starting to force the armature current through the armature impedance but must also, as soon as the armature starts, overcome the electromotive force induced in the armature by rotation, it increases in strength with increase of armature speed, appearing in the stator winding as increased counter-electromotive force. In the series motor the armature is supplied conductively with current and the voltage induced in the armature by rotation appears directly at the armature terminals, so that no "inducing" field exists.

The inducing field in the repulsion motor has an important effect on commutation, since it is cut by the armature coils as they pass under and are momentarily short-circuited by the commutator brushes. The electromotive force induced in the short-circuited coils by cutting this field is in opposition to the electromotive force due to the transformer action on those coils of the exciting or cross-field. This latter electromotive force, which is present in the short-circuited coils of both repulsion and series motors, is dependent on the motor current only, which tends to decrease with increase of speed. The electromotive force produced in the short-circuited coils of the repulsion motor by cutting the inducing field, depends both on the armature speed and on the strength of the inducing field which, as has been pointed out, increases with the speed. Therefore, while at low speeds the effect of the inducing field is beneficial, since the electromotive force induced by cutting it tends to balance the electromotive force due to transformer action in the short-circuited coils, that effect becomes excessive and highly detrimental at high speeds.

By starting the motor with the armature short-circuited and modifying the armature connections to produce a gradually-increasing voltage at the armature terminals as the motor speeds up, the strength of the inducing field is gradually decreased so that for each speed its strength is adapted for securing good commutation. By my invention this desirable result is obtained simply and effectively. In one aspect my invention consists in connecting the armature directly in series with both the exciting and inducing windings on the stator and short-circuiting the armature at starting, and as the motor speeds up modifying the armature connections so as to produce a voltage at the armature terminals. More specifically stated, I insert a gradually-increasing shunt voltage in the armature short-circuit as the motor speeds up.

The method of control outlined above results in maintaining for all speeds an approximate balance between the two electromotive forces mentioned, which, in the ordinary repulsion motor, is attained at low speeds only. There is, however, a third electromotive force in the short-circuited armature coils, which must be provided for, if perfect commutation is to be secured. This is the electromotive force due to commutation reactance. This does not exist at the moment of starting, but as soon as the motor has started, it comes into existence, and even at low speeds is of great importance in its effect on commutation. By electromotive force of commutation reactance is meant the electromotive force due to the reversal of current in each armature coil as it passes under a brush. This electromotive force is in phase with the armature current, and consequently approximately ninety degrees out of phase with the two electromotive forces that have heretofore been considered. In order to neutralize this electromotive force, it is necessary to produce a field, to be cut by the short-circuited coils, which is substantially in phase with the motor currents. I secure this result by short-circuiting the armature through an inductive winding, the effect of which is precisely the same as increasing the leakage-flux of the inducing winding. In other words, it produces a field in phase with the motor currents, which is cut by the short-circuited coils.

It is not necessary to use an inductive winding distinct from the motor windings. The exciting winding of the motor is itself highly inductive, and may be used as the inductive winding by including it in the armature short-circuit. At starting, the exciting winding is preferably connected in series with the inducing winding and the armature short-circuited directly on itself, since the electromotive force of commutation reactance does not come into existence until the armature starts, and since the power-factor at starting is higher when the current required in the exciting winding is supplied to it conductively instead of inductively, as is the case when the exciting winding is connected in the armature short-circuit. As soon as the motor is started, however, the exciting winding is transferred from the circuit of the inducing winding to that of the armature. By means of this transfer of the exciting winding I am enabled to secure another desirable result. At starting a comparatively weak field is desirable in an alternating-current motor in order to permit the high armature current required for a high starting torque, without the production in the motor of a correspondingly strong field flux which would produce excessive heating in the armature coils short-circuited by the brushes and excessive sparking at starting, but when the motor has started, the field-strength should be increased, since otherwise the motor would tend to run at too high a speed. If the compensating winding is designed with a greater number of effective turns than the armature, then since the ampere turns of inducing winding and armature are always substantially the same when a motor is operated as a repulsion motor, the amperes are less in the inducing winding than in the armature. Consequently, by including the exciting winding in series with the inducing winding at starting, the current in the exciting winding corresponds in amount to the smaller current in the inducing winding while by transferring the exciting winding to the armature circuit the current in exciting winding is made to correspond to the larger current in the armature winding.

If the motor is arranged with a greater number of effective turns in the compensating winding than in the armature winding, it would be over-compensated when operated as a direct-current series motor. I avoid this over-compensation, however, by shunting a portion of the current around the compensating winding for direct-current operation.

My invention further comprises the combination of a single-phase motor of the commutator type having exciting and inducing windings on the stator and a controlling switch having its contacts organized and arranged to make successively the proper motor connections for carrying out the method of operation outlined above.

In order that the full benefits of this method of operation may be obtained, it is essential that the magneto-motive forces of the inducing and armature windings should correspond approximately in distribution. It is not ordinarily convenient to distribute the inducing or compensating winding over the entire periphery. This is true whether projecting poles are used on the stator or not If the inducing winding is distributed over a portion only of the stator, and if a full-pitch armature winding is employed, as is customary, the magneto-motive forces of the inducing and armature windings are not similarly distributed; but on the contrary, the field produced by the inducing winding is flat-topped, while the field produced by the armature winding is peaked. Such distributions of magneto-motive force produce leakage-fields which interfere with the results desired, besides reducing the power-factor of the motor. Consequently, in order that the full benefits of my method of operation may be obtained, I give the armature winding a coil-pitch corresponding to the portion of each pole of the stator over which the inducing field is distributed. If, in any given motor, it is convenient to distribute the inducing winding over the entire stator, then a full-pitch armature winding may be employed; but if, as will ordinarily be the case, the inducing winding is distributed over only a portion of each pole of the stator, then the armature winding should be given a fractional pitch corresponding to the portion of the pole-face covered by the inducing winding.

My invention will best be understood by reference to the accompanying drawings, in which—

Figure 2:
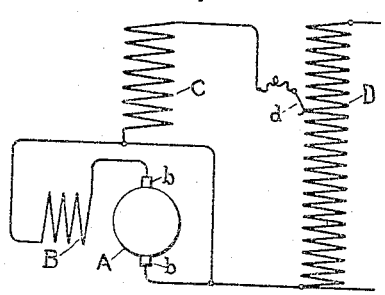
Figure 3:
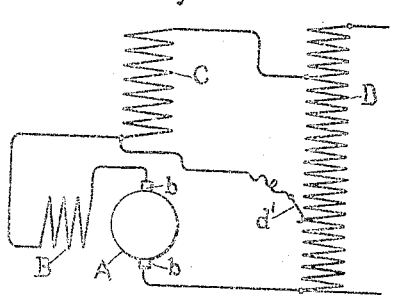
Figure 4:
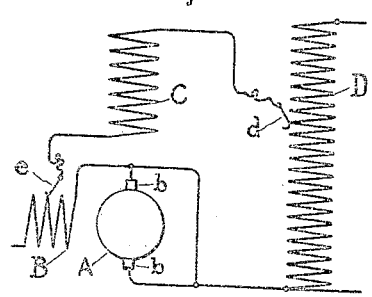
Figure 5:
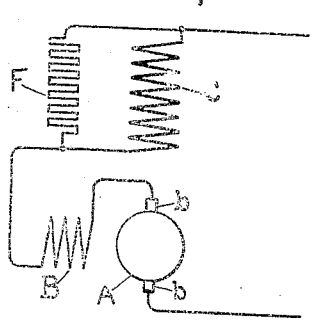
Figure 7:
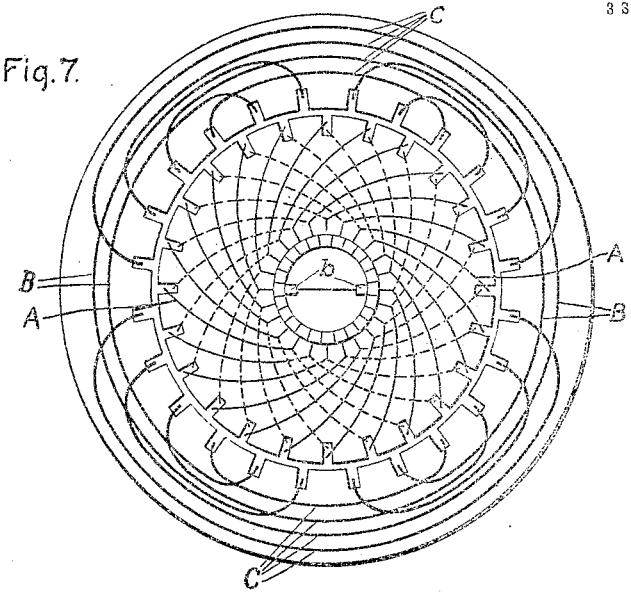
Figure 8:
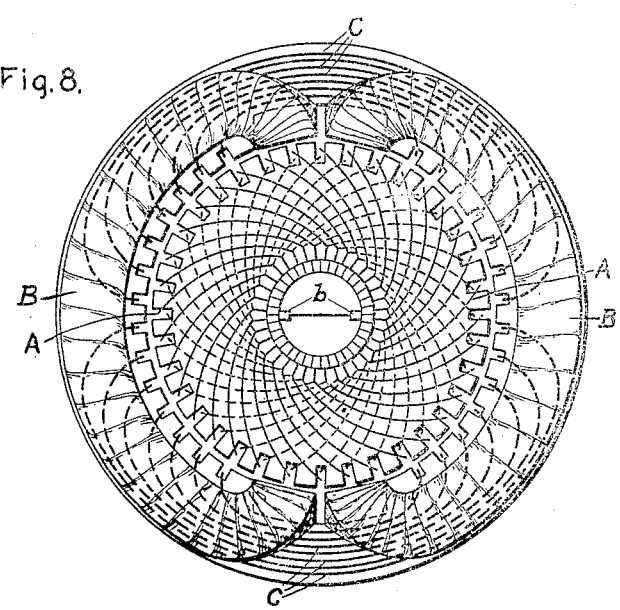

Figures 1, 2 and 3 show diagrammatically the connections for starting, for low speed, and for high speed, respectively, for a single-phase commutator-motor when operated in accordance with my invention; Fig. 4 shows an alternative starting connection; Fig. 5 shows the connections of the motor for direct-current operation; Fig. 6 shows diagrammatically a controlling switch having its contacts organized and arranged to produce the proper circuit-changes for operating the motor in accordance with my invention; Figs. 7 and 8 show diagrammatically the preferred construction of the motor without and with projecting poles on the stator; and Fig. 9 is an explanatory diagram.

Referring to Fig. 9, $OE^1$ represents the voltage impressed on the terminals of the inducing winding of a repulsion motor, and $OI^1$ represents the currents in that winding. If the exciting winding is connected in series with the inducing winding, $OI^1$ represents also the exciting flux of the motor, which is in phase with the current in the exciting winding. This flux induces by transformer action in the armature coils short-circuited by the brushes an electromotive force which lags ninety degrees behind the flux that produces it, and which may be represented by $Oe^1$. The inducing flux,—that is, the flux which produces the counter-electromotive force in the inducing winding, and which produces the current in the armature winding, may be represented by $Om$, ninety degrees behind the voltage $OE^1$ impressed on the inducing winding. This flux $Om$ is cut by the armature coils short-circuited by the brushes in commutation, and produces in those coils an electromotive force in phase with or in opposition to the flux. This latter electromotive force may be represented by $Oe^2$. It will be seen that the electromotive force $Oe^1$ and $Oe^2$ are approximately in opposition, and tend to counterbalance each other. The electromotive force $Oe^1$, however, depends simply on the amount of the motor current, and is independent of the motor speed, except that the current tends to fall with increase of speed. The electromotive force $Oe^2$ on the contrary is independent of the motor current, and increases with the speed. If the voltage impressed on the terminals of the compensating winding is constant, then the flux $Om$ is constant, and the voltage $Oe^2$ is directly proportional to the speed. It is for this reason that for high speeds, I impress a voltage on the armature terminals. This voltage has the effect of reducing the flux $Om$, since the armature voltage is partly impressed directly, instead of being wholly induced by this flux, and consequently $Oe^2$ is reduced, and does not become excessive in amount. By properly proportioning the voltage impressed on the armature, the voltages $Oe^1$ and $Oe^2$ may be kept approximately equal over a wide range of speed.

I have already said that there is a third source of electromotive force in the short-circuited armature coils due to commutation reactance, which electromotive force becomes particularly serious at high speeds. This electromotive force is in phase with or in opposition to the armature current, so that if the current in the armature is represented by $OI^2$, the electromotive force of commutation reactance may be represented by $Oe^3$. Now, if an inductive winding is included in the armature short-circuit so as to produce leakage fields, these fields being in phase with the current $OI^1$ in the inducing winding may be represented by $Om^1$. If these leakage fields are at the proper point to be cut by the armature coils short-circuited by the brushes, there will be induced in these coils, by cutting this field, an electromotive force $Oe^4$ in phase with, or in opposition to, the flux $Om^2$. This electromotive force $Oe^4$ is substantially in opposition to the electromotive force $Oe^3$ of commutation reactance, and consequently tends to neutralize the effect of commutation reactance in the short-circuited coil.

In Fig. 1, A represents the armature provided with commutator and commutator-brushes $b\ b$. B represents the exciting winding, and C the inducing winding, both of which are on the stator. D represents a transformer winding, or other suitable source of current supply for the motor. $d$ represents a contact by means of which the voltage impressed on the motor may be varied. The armature winding A is connected directly in series with both stator windings B and C across a portion of the supply-transformer D, but the brushes b b are short-circuited, so that the motor starts as a simple repulsion motor. The voltage at the armature terminals is zero, and consequently the inducing field, which produces the counter-electromotive force in winding C, is at its maximum.

Fig. 2 shows the low-speed connections, in which the exciting winding B is included in the armature short-circuit. The purpose of this change in the connections of the exciting winding is, as has heretofore been explained, to compensate for the electromotive force of commutation reactance. The exciting winding is highly inductive, and by including it in the rotor short-circuit a leakage-field is produced in the inducing winding C in phase with the motor-currents, and this field, when cut by the armature coils short-circuited by the commutator brushes, produces in the short-circuited coils an electromotive force in opposition to the electromotive force of commutation reactance. At the instant of starting commutation reactance does not exist, and the direct short-circuit of the armature shown in Fig. 1 is better adapted for starting, since the exciting winding is then supplied conductively, so that the starting torque and power-factor of the motor are somewhat higher than would be the case if the motor were started with the connections of Fig. 2. As soon as the motor has started, and commutation reactance comes into existence, a transfer to the connections of Fig. 2 is made. This transfer has an additional advantage if the inducing winding is designed with a greater number of turns than the armature winding, since the ampere turns of the armature and inducing windings are substantially equal, and the current in the exciting winding will be smaller with the connection of Fig. 1, than that of Fig. 2. In other words, the exciting or cross field of the motor will be weaker at starting than in running, which is advantageous, since, in order to prevent the induction of excessive currents in the short-circuited armature coils, a weak field is desirable at starting, while a stronger field is needed after starting to prevent the motor from running at too high a speed. When the connections of Fig. 2 have been established the contact d may be moved upward, so as gradually to increase the voltage impressed on the motor terminals and to accelerate the motor.

As the speed of the motor increases, the connections shown in Fig. 3 are employed. To produce these connections the short-circuit is opened and a shunt voltage derived from the transformer winding D is included in the short-circuit by means of the contact d'. The voltage across the armature terminals is no longer zero, but is a certain portion of the total impressed voltage. The strength of the inducing field is consequently reduced, thereby preventing the electromotive force induced in the short-circuited armature coils by cutting this field from becoming excessive. As the speed is further increased, the contact d' is moved upward, further increasing the voltage at the armature terminals, and at the same time decreasing the voltage across the terminals of the compensating winding. Thus, the portion of the impressed voltage appearing at the armature terminals is increased, and the inducing field correspondingly weakened. By properly adjusting the contact d' for different speeds, the proper strength of inducing field for good commutation at each speed over a very wide range may be obtained.

It has been pointed out above that by properly proportioning the turns of inducing and armature windings, and employing the connections of Fig. 1 for starting, and of Fig. 2 for running at low speeds, there is obtained a weaker field at starting than for running. It will be understood, however, that this weak field at starting may be obtained in other ways, if it is not convenient to employ the relative proportions of compensating and armature turns above mentioned. Fig. 4 shows an alternative method of varying the field-strength by means of contact e arranged to vary the number of turns of the exciting winding.

If the inducing winding is designed with a greater number of turns than the armature winding, the motor, when operated as a series motor on direct-current, would be overcompensated, since the inducing winding then acts as compensating winding; but the compensation can be reduced to the proper amount by the connection shown in Fig. 5, in which the compensating or inducing winding is shunted by a resistance. If the inducing or compensating winding is arranged with twice the effective turns of the armature, the resistance would be proportioned to shunt approximately half the current from the compensating winding for direct current operation.

Fig. 6 shows diagrammatically a suitable controlling switch with its contacts arranged for operating the motor in accordance with my invention. A double-throw switch G is shown for the purpose of connecting the motor for operation on either alternating or direct-current. H represents the controller for alternating-current operation, and I the controller for direct-current operation. When the switch G is thrown to the right and controller H is moved into its first position indicated by the dotted line 1, it will be seen that the three motor windings C, B and A are connected in series across a portion of transformer D, while armature A is directly short-circuited on itself,—that is, the connections are the same as those shown in Fig. 1. In the second position of the controller indicated by dotted line 2, the exciting winding B is included in the armature short-circuit, the connections being as shown in Fig. 2. In moving to the third and fourth positions, 2ᵃ and 2ᵇ, the only change made in the motor connections is to increase the voltage impressed on the compensating winding. In moving from the fourth to the fifth position indicated by dotted line 3, the point of connection between the exciting winding B and inducing winding C, instead of being connected directly to the lower armature brush $b$ and to the lower terminal of transformer winding D, is shifted to an intermediate point on the transformer winding D,—that is, the short-circuit formed by the armature winding A and the exciting winding B is opened to admit a small electromotive force as shown in Fig. 3. In passing to the sixth, seventh and eighth positions, 3ᵃ, 3ᵇ and 3ᶜ, the amount of this shunt electromotive force is gradually increased, producing the same circuit connections as though the contact $d$ in Fig. 3 were moved gradually upward. In the high speed positions, the greater part of the impressed voltage appears at the armature terminals and the inducing field is reduced to the small amount required at those speeds for best commutation. Since all three windings are connected in series, power current can flow through them all in series as in the compensated series motor. At high speeds the motor resembles to a certain extent a series motor with a small commutating field produced by the shunt excitation, but the commutation obtained at each speed from the lowest to the highest is superior to that obtained in either the simple repulsion motor or in the ordinary compensated series motor.

The arrangement of the controller I for direct-current operation is simply illustrative. The controller is arranged to shunt the winding C with a resistance F, as in Fig. 5, and is also shown arranged to place variable portions of a resistance J in series with the motor. Except for the connection of the resistance F, the arrangement of the controller I forms no part of my invention.

As has been said in the early portion of this specification, it is essential, in order that the maximum benefits may be obtained from the method of control which I employ, that the distribution of the magneto-motive forces of the inducing and armature windings should be the same. Fig. 7 shows diagrammatically a standard arrangement of the stator of a motor in which no polar projections are employed but in which the magnetic material is distributed uniformly around the armature. In this figure the inducing winding C is distributed over approximately two-thirds of each pole of the stator, while the remaining third is occupied by the exciting winding B. The armature winding is consequently given a coil-pitch of approximately two-thirds. This results in rendering effective for producing a magneto-motive force only those armature conductors at any instant adjacent to the portions of the stator carrying the compensating winding. The coil conductors in the armature slots opposite the portions of the stator carrying the exciting winding neutralize each other, since the currents in the two coil conductors in each of these slots are in opposite directions. Therefore, the fields produced by the inducing and armature windings are the same shape, and no leakage-fields exist to disturb the relations which it is desired to obtain. Fig. 8 shows the motor arranged with projecting poles and with the exciting coils B concentrated in the interpolar spaces. The inducing windings C are distributed in the usual manner on the pole faces, and the armature coils are given a pitch corresponding approximately to the pole-widths. With this construction, as with that of Fig. 7, the distributions of the magneto-motive forces of the inducing and armature windings are the same.

With the construction of Fig. 8, in which large interpolar spaces are employed, the inducing winding obviously cannot be distributed through the interpolar space, so that a fractional coil-pitch for the armature is necessary. With the construction of Fig. 7, while it is not ordinarily convenient to distribute the inducing winding over the entire stator, since this would require that both inducing and exciting windings should be at least in part superposed, it is, of course, possible to employ a complete distribution of the inducing winding, in which case a full-pitch armature winding may be employed. But by using a fractional-pitch armature winding, as indicated, a complete distribution of the inducing winding is rendered wholly unnecessary.

I do not desire to limit myself to the particular construction and arrangement of parts here shown, but aim in the appended claims to cover all modifications which are within the scope of my invention.

What I claim is—

1. The method of operating an alternating-current motor of the commutator type which consists in starting it as a repulsion motor with the armature directly short-circuited, including an inductive winding in the armature short-circuit for low speeds, and including a shunt voltage in the short-circuit for high speeds.

2. The method of operating an alternating-current motor of the commutator type which consists in starting it as a repulsion motor with the armature directly short-circuited and including an inductive winding in the armature circuit when the motor has started.

3. The method of operating an alternating-current motor of the commutator type having inducing and exciting windings on the stator, which consists in connecting the stator windings in series with each other and with the armature and directly short-circuiting the armature at starting, including the exciting winding in the armature short-circuit for low speeds, and modifying the armature connections to produce an increased voltage at the armature terminals for high speeds 4. The method of operating an alternating-current motor of the commutator type having inducing and exciting windings on the stator, which consists in connecting the stator windings in series across a source of alternating-current, short-circuiting the armature directly at starting and including the exciting winding in the short-circuit when the motor has started.

5. The method of operating an alternating-current motor of the commutator type having inducing and exciting windings on the stator, which consists in connecting all three windings in series across a source of alternating-current, short-circuiting the armature directly at starting, including the exciting winding in the short-circuit for low speeds, and opening the short-circuit and impressing a shunt excitation on armature and exciting windings for high speeds.

6. The method of operating an alternating-current motor of the commutator type which consists in starting it as a repulsion motor with the armature directly short-circuited at starting, including an inductive winding in the short-circuit for low speeds, and impressing a shunt excitation on the two windings in series for high speeds.

7. The method of operating an alternating-current motor of the commutator type having inducing and exciting windings on the stator, which consists in connecting all three windings in series across a source of alternating-current, short-circuiting the armature directly at starting, including the exciting winding in the short-circuit for low speeds, opening the short-circuit and impressing a shunt excitation on armature and exciting windings for higher speeds, and increasing said shunt excitation with further increase of speed.

8. The method of operating an alternating-current motor of the commutator type which consists in starting it as a repulsion motor with the armature directly short-circuited at starting, including an inductive winding in the short-circuit for low speeds, impressing a shunt excitation on the two windings in series for higher speeds, and increasing said shunt excitation with further increase of speed.

9. The method of operating an alternating-current motor of the commutator type having inducing and exciting windings on the stator, which consists in starting the motor with its armature short-circuited and with relatively few ampere turns in the exciting winding and increasing the ampere turns in the exciting winding relatively to the other windings when the motor has started, while maintaining such connections of the exciting winding that it is always directly in series with one of the other windings, so that the motor operates both at starting and running with a series characteristic.

10. The method of operating an alternating-current motor of the commutator type having an exciting winding on the stator and an inducing winding on the stator having a greater number of turns in the inducing winding than the armature which consists in starting the motor with the exciting winding connected in series with the inducing winding and with the armature winding closed through an independent circuit and thereafter including the exciting winding in said independent circuit.

11. The method of operating an alternating-current motor of the commutator type having an exciting winding on the stator and an inducing winding on the stator having a greater number of turns than the armature winding which consists in connecting all three windings in series across a source of alternating current at starting with the armature winding closed through an independent circuit and after the motor has started including said exciting winding in said independent circuit.

12. The method of operating an alternating-current motor of the commutator type having an exciting winding on the stator and an inducing winding on the stator having a greater number of turns than the armature winding, which consists in connecting all three windings in series across an alternating-current source of electromotive force with the armature winding closed through an independent circuit, then including the exciting winding in said independent circuit and finally modifying the circuit connections to include a gradually increasing portion of the electromotive force from said source in said independent circuit.

13. The method of operating an alternating-current motor of the commutator type having an exciting winding on the stator and an inducing winding on the stator having a larger number of turns than the armature winding which consists in starting the motor with all three windings connected in series across a source of alternating-current electromotive force and with the armature winding closed through an independent circuit, then changing the connections of the independent armature circuit to include the exciting winding and thereafter introducing a gradually-increasing electromotive force from said source into said armature circuit and simultaneously reducing the electromotive force impressed on said inducing winding.

14. In combination, a single-phase motor of the commutator type having an exciting winding and an inducing winding on the stator, and a controller having its contacts organized and arranged in its first position to connect the motor to a source of alternating current with its armature or rotor directly short-circuited and in a subsequent position to short-circuit the armature through the exciting winding.

15. In combination, a single-phase motor of the commutator type having an exciting winding and an inducing winding on the stator, and a controlling switch having its contacts organized and arranged in its first position to connect the motor to a source of alternating current with its armature or rotor directly short-circuited in a subsequent position to short-circuit the armature through the exciting winding, and in succeeding positions to modify the short-circuit connection to produce an increase of voltage at the armature terminals.

16. In combination, a single-phase motor of the commutator type having an exciting winding and an inducing winding on the stator, and a controlling switch having its contacts organized and arranged in its first position to connect the motor to a source of alternating current with its armature or rotor directly short-circuited in a subsequent position to short-circuit the armature through the exciting winding, and in succeeding positions to impress a shunt-voltage on the armature and exciting windings in series.

17. In combination, a single-phase motor of the commutator type having an exciting winding and an inducing winding on the stator, a transformer winding for supplying current to the motor, and a controller having its contacts organized and arranged in its first position to connect the three motor windings in series to the transformer winding with the armature winding directly short-circuited in a subsequent position to include the exciting winding in the armature short-circuit and in succeeding positions to connect an intermediate point on the motor circuit to a point on the transformer winding so as to produce an increase of voltage at the armature terminals.

18. In combination, an alternating-current motor having an exciting winding and a distributed inducing winding on the stator and a rotor provided with a commutator and a winding having a coil-pitch approximately equal to the portion of each pole of the stator over which said inducing winding is distributed, a source of alternating-current, and switch contacts arranged to connect the stator windings to said source and to short-circuit the rotor, and to modify the short-circuit to produce a voltage at the rotor terminals.

19. In combination, an alternating-current motor having an exciting winding and a distributed inducing winding on the stator and a rotor provided with a commutator and a winding having a coil-pitch approximately equal to the portion of each pole of the stator over which said inducing winding is distributed, and switch contacts arranged to connect the rotor in series with the stator windings and to short-circuit the rotor and to establish connections for supplying a shunt excitation to the rotor.

20. In combination, an alternating-current motor having an exciting winding and a distributed inducing winding on the stator and a rotor provided with a commutator and a winding having a coil-pitch approximately equal to the portion of each pole of the stator over which said inducing winding is distributed, and switch contacts arranged to short-circuit the rotor directly and indirectly through the exciting winding.

21. In combination, an alternating-current motor having an exciting winding and a distributed inducing winding on the stator and a rotor provided with a commutator and a winding having a coil-pitch approximately equal to the portion of each pole of the stator over which said inducing winding is distributed, and switch contacts arranged to short-circuit the rotor through the exciting winding and to modify the short-circuit to produce an increase of voltage at the rotor terminals.

22. In combination, an alternating-current motor having an exciting winding and a distributed inducing winding on the stator and a rotor provided with a commutator and a winding having a coil-pitch approximately equal to the portion of each pole of the stator over which said inducing winding is distributed, and switch contacts arranged to short-circuit the rotor winding and to include a source of shunt excitation in said short-circuit.

23. In combination, an alternating-current motor having an exciting winding and a distributed inducing winding on the stator and a rotor provided with a commutator and a winding having a coil-pitch approximately equal to the portion of each pole of the stator over which said inducing winding is distributed, and switch contacts arranged to connect all three windings in series and to impress a shunt excitation on a portion of said series circuit.

24. In combination, an alternating-current motor having an exciting winding and a distributed inducing winding on the stator and a rotor provided with a commutator and a winding having a coil-pitch approximately equal to the portion of each pole of the stator over which said inducing winding is distributed, and switch contacts arranged to connect all three windings in series and to impress a shunt excitation on the exciting and rotor windings in series.

25. In combination, an alternating-current motor having an exciting winding and a distributed inducing winding on the stator and a rotor provided with a commutator and a winding having a coil-pitch approximately equal to the portion of each pole of the stator over which said inducing winding is distributed, and switch contacts arranged to connect all three windings in series and to impress a shunt excitation on a portion of said series circuit and to vary the amount of said shunt excitation.

26. In combination, an alternating-current motor having an exciting winding and a distributed inducing winding on the stator and a rotor provided with a commutator and a winding having a coil-pitch approximately equal to the portion of each pole of the stator over which said inducing winding is distributed, and switch contacts arranged to connect all three windings in series and to impress a shunt excitation on the exciting and rotor windings in series and to vary the amount of said shunt excitation.

27. In combination with an alternating-current motor having exciting and inducing windings on the stator and a rotor winding provided with a commutator, said inducing winding having a greater number of effective turns than the rotor winding, and switch contacts arranged to connect the stator windings in series to a source of current with the rotor winding directly short-circuited and thereafter to include said exciting winding in the short-circuit.

28. In combination, an alternating-current motor having an exciting winding and a distributed inducing winding on the stator and a rotor provided with a commutator and a winding having a coil-pitch approximately equal to the portion of each pole of the stator over which said inducing winding is distributed, and a controller comprising switch contacts arranged to first short-circuit the rotor directly, then to include the exciting winding in the short-circuit, and finally to modify the short-circuit to produce an increase of voltage at the rotor terminals.

29. In combination, an alternating-current motor having an exciting winding and a distributed inducing winding on the stator, and a rotor provided with a commutator and a winding having a coil-pitch approximately equal to the portion of each pole of the stator over which said inducing winding is distributed, and a controller comprising switch contacts arranged to first short-circuit the rotor through the exciting winding and then to open said short-circuit and include a source of shunt excitation therein.

30. In combination, an alternating-current motor having an exciting winding and a distributed inducing winding on the stator and a rotor provided with a commutator and a winding having a coil-pitch approximately equal to the portion of each pole of the stator over which said inducing winding is distributed, and switch contacts arranged to connect the motor to a source of alternating current with the rotor and exciting windings in series across a source of shunt excitation.

31. In combination, an alternating-current motor having an exciting winding and a distributed inducing winding on the stator and a rotor provided with a commutator and a winding having a coil-pitch approximately equal to the portion of each pole of the stator over which said inducing winding is distributed, and a controller comprising switch contacts arranged to connect the motor to a source of alternating current with the rotor and exciting windings in series across a source of shunt excitation and then to vary the amount of said shunt excitation.

32. In combination, an alternating-current motor having an exciting winding and a distributed inducing winding on the stator and a rotor provided with a commutator and a winding having a coil-pitch approximately equal to the portion of each pole of the stator over which said inducing winding is distributed, and a controller comprising switch contacts arranged to connect all three windings in series across a source of alternating current with the rotor winding short circuited, and then to include a variable source of shunt excitation in the short-circuit.

33. In combination, an alternating-current motor having an exciting winding and a distributed inducing winding on the stator and a rotor provided with a commutator and a winding having a coil-pitch approximately equal to the portion of each pole of the stator over which said inducing winding is distributed, and switch contacts arranged to connect all three windings in series across a source of alternating current, to short-circuit the rotor winding through the exciting winding, and to include a variable source of shunt excitation in the short-circuit.

34. In combination, an alternating-current motor having an exciting winding and a distributed inducing winding on the stator and a rotor provided with a commutator and a winding having a coil-pitch approximately equal to the portion of each pole of the stator over which said inducing winding is distributed, a transformer winding for supplying current to the motor, and switch contacts arranged to connect all three motor windings in series to the transformer winding with the exciting winding between the inducing and rotor windings and to connect the point of connection of exciting and inducing windings to an intermediate point on the transformer winding.

35. In combination, an alternating-current motor having an exciting winding and a distributed inducing winding on the stator and a rotor provided with a commutator and a winding having a coil-pitch approximately equal to the portion of each pole of the stator over which said inducing winding is distributed, a transformer winding for supplying current to the motor, and switch contacts to connect all three motor windings in series to the transformer winding with the exciting winding between the inducing and rotor windings and to connect the point of connection of exciting and inducing windings to different intermediate points on the transformer winding.

36. In combination, an alternating-current motor having an exciting winding and a distributed inducing winding on the stator and a rotor provided with a commutator and a winding having a coil-pitch approximately equal to the portion of each pole of the stator over which said inducing winding is distributed, a transformer winding for supplying current to the motor, and switch contacts arranged to connect all three motor windings in series to the transformer winding and to connect an intermediate point in the circuit of the motor windings to an intermediate point on the transformer winding.

37. In combination, an alternating-current motor having an exciting winding and a distributed inducing winding on the stator and a rotor provided with a commutator and a winding having a coil-pitch approximately equal to the portion of each pole of the stator over which said inducing winding is distributed, a transformer winding for supplying current to the motor, and switch contacts arranged to connect all three motor windings in series to the transformer winding and to connect an intermediate point in the circuit of the motor windings to different intermediate points on the transformer winding.

38. In combination, with an alternating-current motor having exciting and inducing windings on the stator and a rotor winding provided with a commutator, said inducing winding having a greater number of effective turns than the rotor winding, switch contacts arranged to short-circuit the rotor winding directly and to include said exciting winding in the short-circuit for operation as a repulsion motor on alternating-current, and switch contacts arranged to connect the motor as a series motor for direct-current operation and to reduce the effective ampere turns of the inducing winding.

39. In combination with an alternating-current motor having exciting and inducing windings on the stator and a rotor winding provided with a commutator, said inducing winding having a greater number of effective turns than the rotor winding, and switch contacts arranged to short-circuit the rotor winding directly and to include said exciting winding in the short-circuit for operation as a repulsion motor on alternating-current, and switch contacts arranged to connect the motor as a series motor for direct-current operation and to shunt a portion of the motor current around the inducing winding.

40. In combination, an alternating-current motor having on the stator an exciting winding and an inducing winding distributed over a portion only of the stator, and a rotor provided with a commutator and a winding having a coil-pitch approximately equal to the portion of each pole of the stator over which said winding is distributed, a source of alternating current, and means for connecting said motor to said source as a repulsion motor and for modifying the short-circuit to produce a voltage at the rotor terminals.

41. In combination, an alternating-current motor having on the stator an exciting winding and an inducing winding distributed over a portion only of the stator, and a rotor provided with a commutator and a winding having a coil-pitch approximately equal to the portion of each pole of the stator over which said inducing winding is distributed, and switch contacts arranged to short-circuit and to establish connections for supplying a shunt excitation to the rotor.

42. In combination, an alternating-current motor having on the stator an exciting winding and an inducing winding distributed over a portion only of the stator, and a rotor provided with a commutator and a winding having a coil-pitch approximately equal to the portion of each pole of the stator over which said inducing winding is distributed, and switch contacts arranged to short-circuit the rotor directly and indirectly through the exciting winding.

43. In combination, an alternating-current motor having on the stator an exciting winding and an inducing winding distributed over a portion only of the stator, and a rotor provided with a commutator and a winding having a coil-pitch approximately equal to the portion of each pole of the stator over which said inducing winding is distributed, and switch contacts arranged to short-circuit the rotor through the exciting winding and to modify the short-circuit to produce an increase of voltage at the rotor terminals.

44. In combination, an alternating-current motor having on the stator an exciting winding and an inducing winding distributed over a portion only of the stator, and a rotor provided with a commutator and a winding having a coil-pitch approximately equal to the portion of each pole of the stator over which said inducing winding is distributed, and switch contacts arranged to connect all three windings directly in series across a source of alternating current, to short-circuit the rotor winding, and to include a source of shunt excitation in said short-circuit.

45. In combination, an alternating-current motor having on the stator an exciting winding and an inducing winding distributed over a portion only of the stator, and a rotor provided with a commutator and a winding having a coil-pitch approximately equal to the portion of each pole of the stator over which said inducing winding is distributed, and switch contacts arranged to connect all three windings in series across a source of alternating-current, and to impress a shunt excitation on a portion of said series circuit.

46. In combination, an alternating-current motor having on the stator an exciting winding and an inducing winding distributed over a portion only of the stator, and a rotor provided with a commutator and a winding having a coil-pitch approximately equal to the portion of each pole of the stator over which said inducing winding is distributed, and switch contacts arranged to connect all three windings in series across a source of alternating current and to impress a shunt excitation on the exciting and rotor windings in series.

47. In combination, an alternating-current motor having on the stator an exciting winding and an inducing winding distributed over a portion only of the stator, and a rotor provided with a commutator and a winding having a coil-pitch approximately equal to the portion of each pole of the stator over which said inducing winding is distributed, and switch contacts arranged to short-circuit the rotor through the exciting winding and to open said short-circuit and include a source of shunt excitation therein.

48. In combination, an alternating-current motor having on the stator an exciting winding and an inducing winding distributed over a portion only of the stator, a rotor provided with a commutator and a winding having a coil-pitch approximately equal to the portion of each pole of the stator over which said inducing winding is distributed, and switch contacts arranged to connect the rotor and exciting windings in series across a source of shunt excitation.

49. In combination, an alternating-current motor having on the stator an exciting winding and an inducing winding distributed over a portion only of the stator, a rotor provided with a commutator and a winding having a coil-pitch approximately equal to the portion of each pole of the stator over which said inducing winding is distributed, a transformer winding for supplying current to the motor, and switch contacts arranged to connect all three motor windings in series to the transformer winding with the exciting winding between the inducing and rotor windings and to connect the point of connection of exciting and inducing windings to an intermediate point on the transformer winding.

50. In combination, an alternating-current motor having on the stator an exciting winding and an inducing winding distributed over a portion only of the stator, a rotor provided with a commutator and a winding having a coil-pitch approximately equal to the portion of each pole of the stator over which said inducing winding is distributed, a transformer winding for supplying current to the motor, and switch contacts arranged to connect all three motor windings in series to the transformer winding and to connect an intermediate point in the circuit of the motor winding to an intermediate point on the transformer winding.

In witness whereof I have hereunto set my hand this 13th day of July, 1907.

ERNST F. W. ALEXANDERSON.

Witnesses:
HELEN ORFORD,
BENJAMIN B. HULL.